Figure 1:
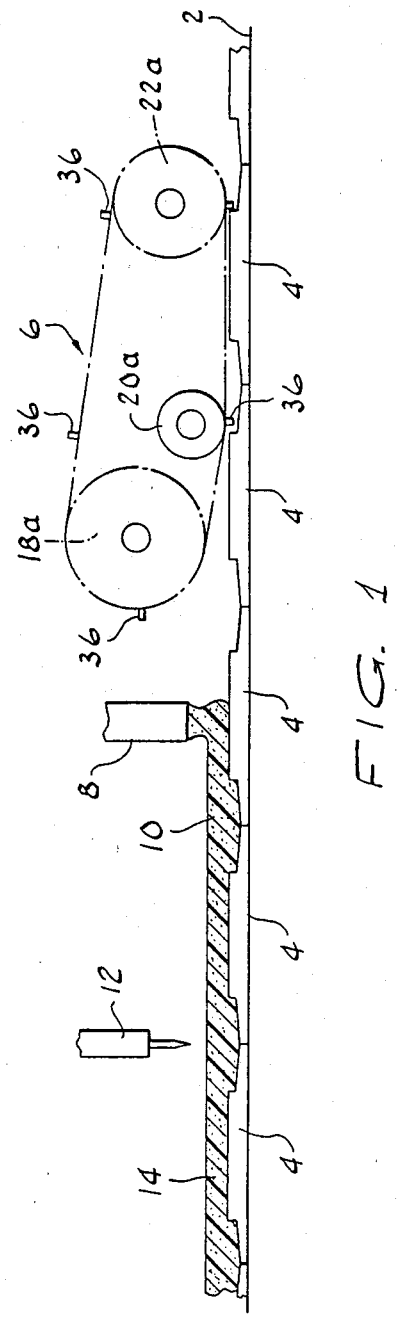

United States Patent [19]

Van Heel et al.

[11] 4,386,694
[45] Jun. 7, 1983

[54] CONVEYING APPARATUS FOR TILE MAKING MACHINES

[75] Inventors: Theodore Van Heel; Henry Van Heel, both of Narre Warren, Australia

[73] Assignee: Burgos Pty. Limited, Melbourne, Australia

[21] Appl. No.: 877,712

[22] Filed: Feb. 14, 1978

Related U.S. Application Data

[63] Continuation-in-part of Ser. No. 732,662, Oct. 15, 1976, abandoned.

[30] Foreign Application Priority Data

Oct. 15, 1975 [AU] Australia .................................. PC3586

[51] Int. Cl.³ .............................................. B65G 49/00
[52] U.S. Cl. ..................................... 198/648; 198/728; 425/253
[58] Field of Search ............... 198/462, 472, 648, 726, 198/728, 730, 733, 461; 425/253, 289, 317, DIG. 201

[56] References Cited

U.S. PATENT DOCUMENTS 3,194,382  7/1965  Nigrelli et al. ..................... 198/461
3,677,686  7/1972  Powel .................................. 425/253

Primary Examiner—Joseph E. Valenza
Attorney, Agent, or Firm—Fleit & Jacobson

[57] ABSTRACT

A conveying apparatus is disclosed for conveying pallets upon which cement is deposited for continuous moulding of cement tiles. The pallets each have a projecting shoulder portion and are of predetermined length and the apparatus includes a support over which the pallets are conveyed in a continuous stream with adjacent pallets in contact with one another, the drive mechanism for moving the pallets along the support, said drive means including an endless band located above the support and having a run in the direction which the pallets are conveyed over the support, the band having drive members projecting outwardly therefrom for engagement with the shoulders of the pallets for moving the pallets.

9 Claims, 4 Drawing Figures

CONVEYING APPARATUS FOR TILE MAKING MACHINES

RELATED APPLICATIONS

This application is a continuation-in-part of co-pending application U.S. Ser. No. 732,662, filed Oct. 15, 1976, now abandoned filed in the names of the present inventors.

This invention relates to conveying apparatus for conveying pallets particularly, but not exclusively pallets of the type which are used in machinery for making tiles, slabs, bricks, blocks, cable covers and like products from such materials as cement, plastics, bituminous, and asphalt and mixes of various compositions. Hereinafter, the invention will be described with reference to making of tiles but it is to be understood that the invention is equally applicable to the manufacture of any of the foregoing products.

Various machines have been proposed for making tiles in which pallets, defining the underface of the tile, are fed in an end-to-end stream below a hopper containing a concrete mix where the stream received mix which is metered and shaped by a shaping element such as a roller to form on the pallets an extruded ribbon having an under surface shaped to the shape of the top surface of the pallets and a top surface to the shape of the element. The continuous ribbon of mix so formed on the base provided by the end-to-end pallets is cut at each pair of adjacent pallet ends to form individual pallet-borne elements which are thereafter racked and the mix cured on the pallets. The cured tiles are then removed from the pallets which are returned for reloading. An important part of such machines is the conveying apparatus which drives the pallets through the machine. Large driving forces need to be applied to the pallets so that their ends remain in tight engagement so as to avoid gaps between adjacent pallets, which gaps would permit uncured cement to be lost from the pallets. Further, the conveying apparatus should move the pallets as quickly as possible through the machine so as to ensure efficiency of operation. It is the object of the invention to provide a new form of conveying apparatus which is capable of driving pallets quickly and maintaining end-to-end contact in a stream of pallets.

According to the present invention there is provided conveying apparatus for conveying pallets of the type having a projecting shoulder portion and being of a pre-determined length, said apparatus including a support over which the pallets are conveyed in a continuous stream with adjacent pallets in contact with one another, drive means for moving the pallets along the support, said drive means including a sprocket located above and adjacent to the support, a chain which passes about said sprocket, and drive members fixedly connected to the chain, said sprocket defining the beginning of a run of the chain in the direction which the pallets are conveyed over the support, said drive members projecting outwardly from the chain for engagement with the shoulders of the pallets for moving the pallets, and wherein the spacing between the drive members is slightly less than the pre-determined length of the pallets so that on engagement with a shoulder of a pallet, movement of the pallet by the drive member causes the preceding pallet in the stream to move forwardly and lose contact with the preceding drive member of said endless chain.

Figure 2:
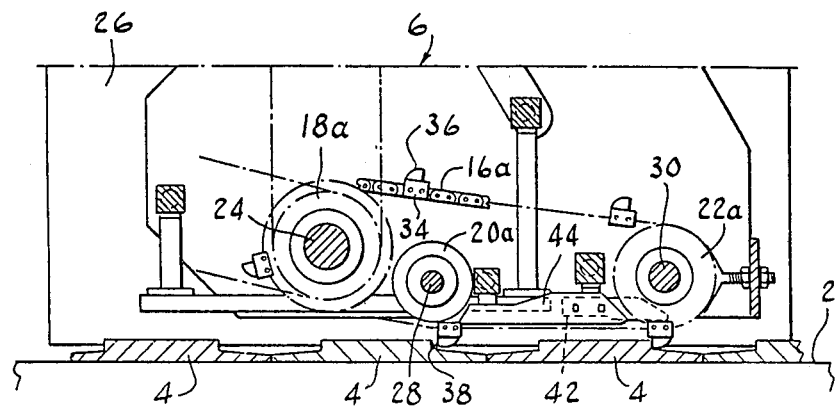
Figure 3:
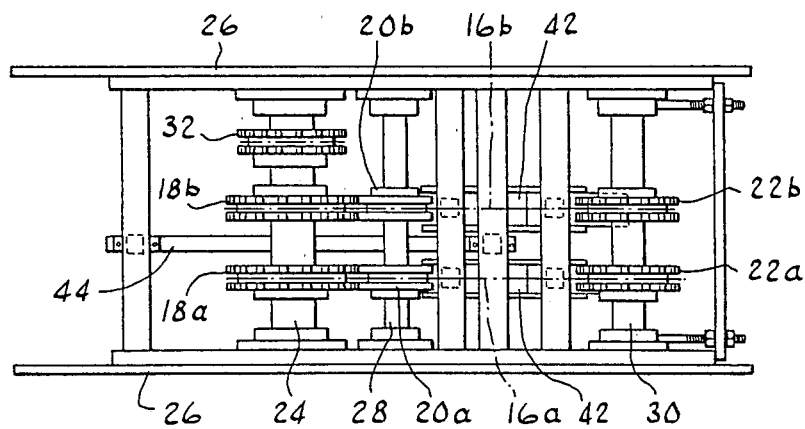
Figure 4:
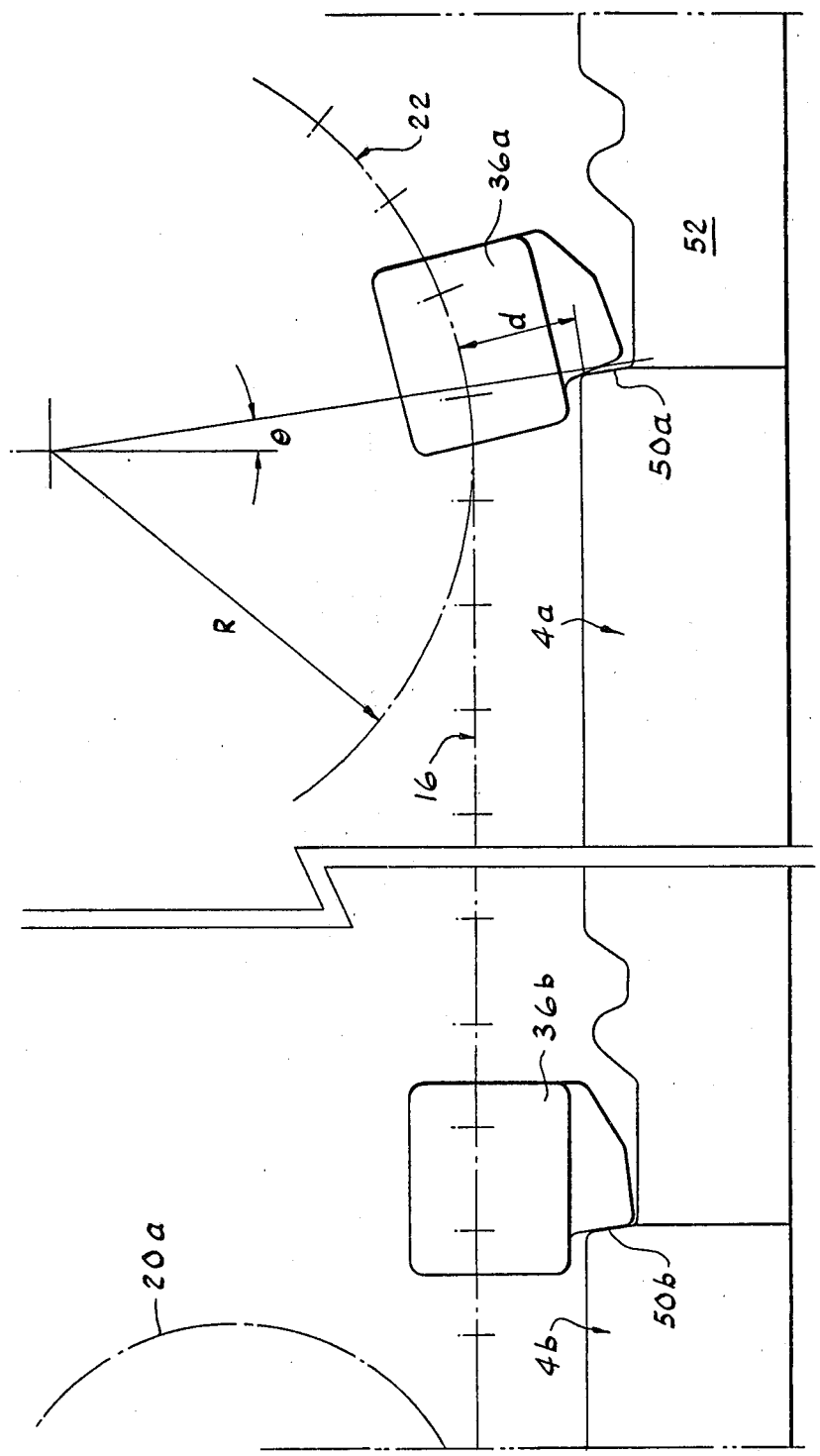

The invention will now be further described with reference to the accompanying drawings, in which:

FIG. 1 is a schematic view of a tile making machine incorporating the conveying apparatus of the invention, FIG. 2 is a side view of part of the conveying apparatus of the invention, FIG. 3 is a plan view of the part of the apparatus shown in FIG. 2, and FIG. 4 is a schematic diagram useful in understanding the invention.

The tile making apparatus shown in FIG. 1 comprises a support surface 2 over which a stream of pallets 4 is conveyed. The pallets 4 are driven over the surface 2 by a drive apparatus 6 of the invention. The pallets pass a cement extrusion head 8 which extrudes the layer 10 of uncured cement over the pallets. The layer 10 then passes a guillotine 12 which cuts the layer 10 above the abutting ends of the pallets 4 to form individual tiles 14 borne on the pallets. The top surface of the pallets 4 serves as a mould for the undersides of the completed tiles 14 and means (not shown) is provided for shaping the top surface of the tiles.

FIGS. 2 and 3 illustrate in greater detail part of the drive mechanism 6. The mechanism includes a pair of spaced chains 16a and 16b each of which extends about three sprockets 18a, 18b, 20a, 20b and 22a and 22b. The sprockets 18a and 18b are mounted upon a shaft 24 which extends between side plates 26. Similarly, the sprockets 20a, 20b and 22a, 22b are mounted upon shafts 28 and 30 which extend between the side plates 26. The shaft 24 includes a third sprocket 32 which is driven by a motor (not shown) located above the shaft 24 for driving the sprockets 18a, 18b, 20a, 20b and 22a and 22b in synchronism.

Each of the chains 16a and 16b has mounted thereon a number of lugs 34 each having an outwardly projecting driving member 36. The driving members 36 are arranged to come into engagement with shoulders 38 which form part of the pallets 4. The chains 16a and 16b between the sprockets 22a, 22b and 20a and 20b are horizontal and parallel to the support surface 2 and form driving runs for the apparatus where at least one of the drive members 36 is in engagement with one of the shoulders 38 of the pallets 4.

FIG. 4 illustrates a drive member 36a first contacting the shoulder 50a of a pallet 52. At that instant the upstream drive member 30b is still in driving contact with the upstream shoulder 50b, thus because of the angular position $\theta$ of the lug 36a with respect to the beginning of the horizontal run of the chain, the effective horizontal spacing of the lugs 36a and 36b is equal to the pitch of shoulders 50a and 50b, even though the spacing of the lugs 36a and 36b at the chain is less than the pitch of the shoulders. Additionally at the point of first contact of the lug 36a with the shoulder 50a, the point of contact 52 will have the following horizontal component of velocity:

$$V_1 = (R+d)w \cos \theta$$

where

R = effective radius of the sprocket 22 d = radial distance from the sprocket to the point of first contact 52 w = angular velocity of the sprocket 22

However, the horizontal velocity of the shoulder 50a, being the same as that of the upstream shoulder 50b will be:

$$V_s = wR$$

Thus provided that $$\cos \theta > [R/(R + d_o)]$$

$$V_1 > V_s$$

and thus the lug 36a will be moving faster in the horizontal direction than the shoulder 50a so that, on further rotation of the sprocket 22 the lug will accelerate the shoulder 50a so that it moves in contact therewith. This of course advances the pallet momentarily at a rate greater than wR so that the downstream shoulder 50b will be displaced forwardly relative to the lug 36b and so lose contact therewith. The lug 36a then continues to drive the pallets 50 until the next upstream lug contacts the next upstream pallet and so on. The downstream lug which loses contact with the pallets can be diverted upwardly without interferring with the pallets. An apparatus having the following dimensions has been constructed and found to operate successfully:

sprocket 22 effective radius: 3.99 inches
lug 36 projecting distance from effective radius of sprocket: 2.125 inches
distance
d: 1.19 inches
$\theta$: 8.5°
length of pallets: 17.25 inches
pitch of lugs on chain: 17.0 inches
$\Delta$: 0.25 inches
distance between top of pallets and the effective radius of the sprocket = 1.063 inches.

The potential problem of jamming of the drive members 36 with the shoulder 38 beneath the sprockets 20a and 20b is further alleviated by arranging for a comparatively slow upward incline of the chain 16a and 16b following the sprockets 20a and 20b. Accordingly, the locations of the shafts 24 and 28 and the diameters of the sprockets 20a, 20b and 18a, 18b are chosen to give a relatively slight upward incline of the chains 16a 16b between the sprockets 20a, 20b, 18a, 18b.

As best seen in FIG. 2, the mechanism further includes a guide bar 40 for preventing excessive upward movement of the pallets. Further, guides are provided to guide the chains 16a, 16b between the sprockets 20a, 20b and 22a, 22b. The guides include a first member 42 for preventing the chains from tending to ride upwardly with the sprockets 22a 22b. The guides further include side plates 44 located on either side of each of the chains 16a and 16b to prevent excessive lateral deviation of the chains.

Preliminary calculations indicate that with the driving mechanism 6 of the type shown in FIGS. 2 and 3 the tile making machine will be capable of producing tiles at a rate of up to 113 tiles per minute which is considerably faster than existing tile making machines.

In the illustrated arrangement the pitch differential between the drive members is 0.25 inches but this could be in the range about 0.0625 to 1.0 inches, i.e. from about 0.3% to 5% of the length of the pallets. Further, the upwardly inclined runs of the chains between the sprockets 20a and 18a is at an angle of about 8° but this could be varied within the range 5° to 15°.

We claim:

1. Conveying apparatus for conveying pallets of the type having a projecting shoulder portion and being of pre-determined length, said apparatus including a support over which the pallets are conveyed in a continuous stream with adjacent pallets in contact with one another, drive means for moving the pallets along the support, said drive means including a first sprocket located above and adjacent to the support, a first chain which passes about the first sprocket, drive members fixedly connected to the first chain, and means cooperating with said first sprocket for defining a run of the first chain in the direction which the pallets are conveyed over the support, said first sprocket being located at the beginning of the run, said drive members projecting outwardly from the first chain for engagement with the shoulders of the pallets for moving pallets, and wherein the spacing between the drive members is slightly less than the pre-determined length of the pallets so that, on engagement of a portion of a drive member with a shoulder of a pallet, movement of the pallet by the drive member causes the preceding pallet in the stream to move forwardly and lose contact with the preceding drive member.

2. Apparatus as claimed in claim 1 wherein the differential spacing between the drive members and the length of the pallets is in the range of 0.0625 to 1.0 inches.

3. Apparatus as claimed in claim 2 wherein the length of the pallets is about 17 inches and said spacing is about 0.25 inches.

4. Apparatus as claimed in claim 1 wherein said drive means further includes a second sprocket located above and adjacent to the support and a second chain which passes about said second sprocket and is located in spaced parallel relation with said first chain of said drive means.

5. Apparatus as claimed in claim 1 wherein said drive means further comprises second and third sprockets, said first chain extending about said sprockets and having a run defined between said first sprocket and said second sprocket, the axes of said first sprocket and said second sprocket being separated by a distance which is in excess of said pre-determined length of the pallets.

6. Apparatus as claimed in claim 5 wherein the axes of the first and second sprockets are separated by a distance which is 10% to 15% greater than the predetermined length of the pallets.

7. Apparatus as claimed in claim 5 wherein the lower periphery of the third sprocket is higher than the lower peripheries of the first and second sprockets whereby, the first chain has a second run defined between the second and third sprockets, the second run being inclined upwardly relative to the first run.

8. Apparatus as claimed in claim 7 wherein the second run is directed upwardly at an angle of about 8°.

9. Conveying apparatus for conveying pallets of the type having a projecting shoulder portion and being of pre-determined length, said apparatus including:
a support over which the pallets are conveyed in a continuous stream with adjacent pallets in contact with one another; and
drive means for moving the pallets along said support, said drive means including means for guiding an endless chain for movement above said support, said guiding means including a sprocket located above and adjacent to said support; an endless chain which passes about said sprocket; and a plurality of drive members, each of said drive members having a portion fixedly connected to said endless chain and, a portion projecting outwardly from said endless chain, said guiding means defining a run for said endless chain in the direction which the pallets are conveyed over said support with said sprocket being located at the beginning of said run, said projecting portions of said drive members being engageable with the shoulders of the pallets for moving the pallets, and wherein the spacing between said connected portions of said drive members is slightly less than the pre-determined length of the pallets and the location of said sprocket is such that, upon first engagement of a projecting portion with a shoulder of a pallet, the projecting portion has a greater velocity in said direction than the connected portion so that movement of the pallet by the drive member causes the preceding pallet in the stream to move forwardly and lose contact with the preceding drive member.

* * * * *